… …

United States Patent [19]

Buzak

[11] Patent Number: 4,674,841
[45] Date of Patent: Jun. 23, 1987

[54] COLOR FILTER SWITCHABLE AMONG THREE STATE VIA A VARIABLE RETARDER

[75] Inventor: Thomas S. Buzak, Beaverton, Oreg.

[73] Assignee: Tektronix, Inc., Beaverton, Oreg.

[21] Appl. No.: 710,197

[22] Filed: Mar. 8, 1985

[51] Int. Cl.⁴ ............................................. G02F 1/135
[52] U.S. Cl. ................................. 350/337; 350/347 R; 350/347 E
[58] Field of Search ................... 350/388, 408, 347 E, 350/398, 341, 347 R, 389, 387

[56] References Cited

U.S. PATENT DOCUMENTS

| | | | |
|---|---|---|---|
| 2,586,635 | 2/1952 | Frensler | 350/408 X |
| 2,753,763 | 12/1952 | Haines | 350/408 |
| 2,834,254 | 5/1958 | Sage | 350/388 |
| 3,501,219 | 3/1970 | Caulfield | 350/150 |
| 3,785,721 | 1/1974 | Harsch | 350/347 E |
| 3,834,792 | 9/1974 | Janning | 350/341 |
| 3,838,906 | 10/1974 | Kumada | 350/389 X |
| 3,915,553 | 10/1975 | Adams et al. | 350/388 |
| 4,025,164 | 5/1977 | Doriguzzi et al. | 350/408 X |
| 4,068,926 | 1/1978 | Nakamura | 350/337 |
| 4,097,130 | 6/1978 | Cole, Jr. | 350/335 |
| 4,239,349 | 12/1980 | Scheffer | 350/337 X |
| 4,343,535 | 8/1982 | Bleha | 350/339 F X |
| 4,383,737 | 5/1983 | Hibino et al. | 350/347 E |
| 4,385,806 | 5/1983 | Fergason | 350/347 E X |
| 4,401,369 | 8/1983 | Jones | 350/349 |
| 4,416,514 | 11/1983 | Plummer | 350/337 X |
| 4,444,469 | 4/1984 | Kaye | 350/347 E |
| 4,497,543 | 2/1985 | Aoki | 350/337 |
| 4,541,691 | 9/1985 | Buzak | 350/335 |

FOREIGN PATENT DOCUMENTS

| | | |
|---|---|---|
| 0142316 | 11/1980 | Japan . |
| 0933252 | 8/1963 | United Kingdom ................ 350/398 |
| 1270812 | 4/1972 | United Kingdom . |
| 1396828 | 6/1975 | United Kingdom ............ 350/347 E |
| 1462978 | 1/1977 | United Kingdom ............ 350/347 R |
| 1469638 | 4/1977 | United Kingdom . |
| 2011641 | 7/1979 | United Kingdom . |
| 1569516 | 6/1980 | United Kingdom . |

OTHER PUBLICATIONS

Chabicovsky et al., "A Matrix Addressed Liquid Crystal Color Display", Conference Record of 1978 Biennial Display Research Conference, Cherry Hill, N.Y., 24–26 Oct. 1978.

Shimomura et al., "Voltage Controllable Color Formation with a Twisted Nematic Liquid Crystal Cell", Japan. J. Appl. Phys., vol. 14 (1975), No. 7, pp. 1093–1094.

Primary Examiner—John K. Corbin
Assistant Examiner—David Lewis
Attorney, Agent, or Firm—John D. Winkelman; Paul S. Angello

[57] ABSTRACT

A switchable color filter (10) develops with the use of a single electro-optic switching device positioned between first and second polarizing filter means (14 and 16) an output of three desaturated colors that define an area (54) in color space. The switching device comprises a variable optical retarding means (12) that includes a variable optical retarder (18) and a quarter-wave plate (20). The first and second filter means pass light rays of three primary colors. The variable optical retarding means selectively provides zero, quarter-wave, and half-wave retardation of light rays passing through it to develop the three output colors. The quarter-wave plate is positioned such that it forms a circular analyzer for one of the three primary colors when the variable optical retarder provides quarter-wave retardation. Each of the three output colors is a mixture of at least two of the primary colors.

17 Claims, 6 Drawing Figures

FIG. 4A (ON)
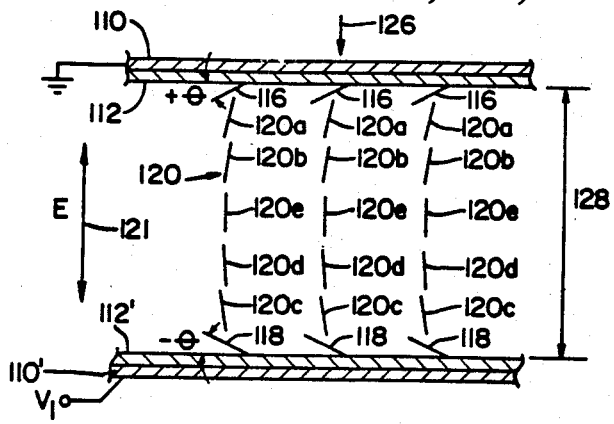
FIG. 4B (OFF)
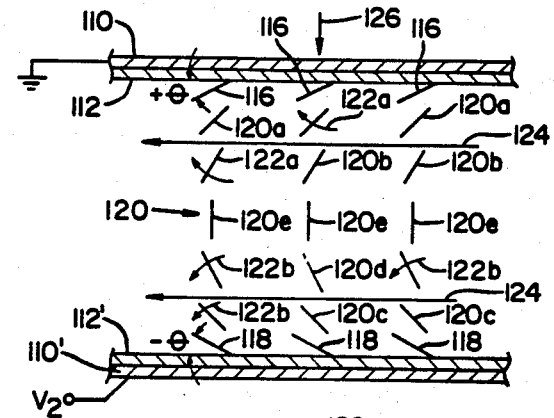
FIG. 4C (INTERMEDIATE)
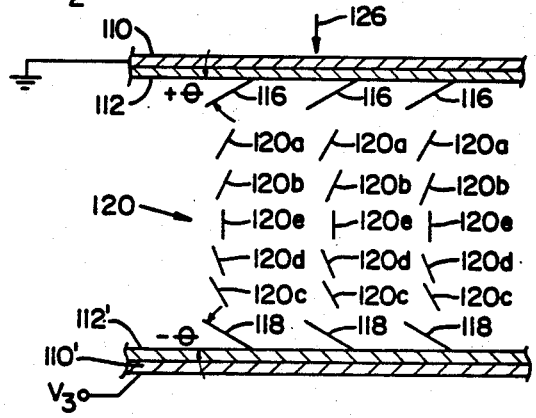
FIG. 3
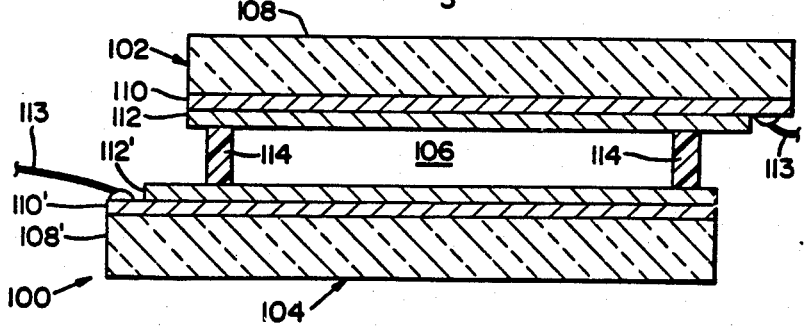

COLOR FILTER SWITCHABLE AMONG THREE STATE VIA A VARIABLE RETARDER

TECHNICAL FIELD

The present invention relates to switchable color filters, and in particular, a quasi full color switchable color filter that incorporates a single variable optical retarder in association with a quarter-wave plate to develop a light output of three desaturated colors that define a color gamut which encompasses an area of color space.

BACKGROUND OF THE INVENTION

A switchable color filter of the limited color type typically comprises a single electro-optic switching device that is positioned between color selective and neutral polarizing filters to selectively provide a light output of one of two primary colors. One type of electro-optic switching device used in such a color filter is a twisted nematic liquid crystal cell. A switching circuit connected to the twisted nematic cell delivers an electrical signal of selectable amplitude or frequency to rotate by either 0° or 90° the plane of polarization of light rays passing through it. Each of the two polarization directions provides a light output of one of the two primary colors. The colors of light that can be developed at the output of the color filter range along a line in color space between the two primary colors.

Another type of electro-optic switching device used in such a color filter is described in copending application of Philip J. Bos and Philip A. Johnson, Jr., Ser. No. 06/493,106, filed May 9, 1983, now U.S. Pat. No. 4,582,396 for "Field Sequential Color Display System." This patent application describes the use of a liquid crystal variable optical retarder as the electro-optic switching device. A switching circuit selectively commands the variable optical retarder to its field aligned "ON" state to provide essentially zero optical retardation for light rays of all colors and to its partly relaxed "OFF" state to provide half-wave optical retardation of light rays of the color to which the retarder is tuned. Each of the two optical retardation states provides a light output of one of the two primary colors. The colors of light developed at the output of the color filter also can range along a line in color space between the two primary colors.

Neither of the above-described switchable color filters is capable of providing with a single electro-optic switching device a light output of three colors that define a color gamut encompassing an area of color space. It is also known that a switchable color filter of the full color type provides a light output of three colors but requires at least two electro-optic switching devices to accomplish the task.

SUMMARY OF THE INVENTION

It is an object of the present invention, therefore, to provide a switchable color filter that develops with the use of a single electro-optic switching device an output of three desaturated colors that define a color gamut which encompasses an area in color space.

Another object of this invention is to provide in such a switchable color filter an electro-optic switching device that operates as a variable optical retarder to provide the three desaturated output colors and thereby develop a quasi full color output.

A further object of this invention is to provide such a variable optical retarder that provides three different amounts of optical retardation to develop the three output colors.

The present invention is a switchable color filter that receives light rays of different wavelengths emitted from a light source. The switchable color filter comprises a first color selective light polarizing means that transmits polarized light rays of three primary colors. A variable optical retarding means receives and varies the optical retardation of the polarized light rays exiting the first light polarizing means. A switching means communicates with the variable optical retarding means to selectively vary the amount of optical retardation of the light rays passing through it. A second color selective light polarizing means transmits light rays of three output colors, each corresponding to a different amount of retardation provided by the variable optical retarding means. Each output color includes components of at least two of the three primary colors so that the three output colors define a color gamut which encompasses an area of color space.

The first light polarizing means is a linear polarizing filter that passes light rays of the primary colors red, green, and blue, the red and green light rays passing through its vertical polarization axis and the blue light rays passing through its horizontal polarization axis. The variable optical retarding means includes a quarter-wave plate and a variable optical retarder that selectively provides three amounts of optical retardation to develop three different output colors. The switching means or control circuit commands the variable optical retarder to one of three optical retardation states, the "ON" state which produces zero retardation for light rays of all colors, the "OFF" state which produces half-wave retardation for light rays of a predetermined color, and the "INTERMEDIATE" state which provides quarter-wave retardation for light rays of the predetermined color. The quarter-wave plate also provides quarter-wave retardation for light rays of only the predetermined color. Green is selected as the predetermined color because of its mid-range location in the color spectrum. The quarter-wave plate and the variable optical retarder provide, however, approximately quarter-wave and half wave retardation for light rays of colors other than that to which they are tuned.

Providing quarter-wave retardation and half-wave retardation for light rays of only one primary color causes the mixture of lower intensity contaminant light rays of an unintended color with the light rays of the intended output color. Each output color is, however, a mixture of at least two of the primary colors, with one primary color dominating the others. That the variable optical retarder provides quarter-wave retardation and half-wave retardation of only one predetermined primary color is, therefore, insignificant because each of the three output colors is an intended mixture of at least two primary colors.

The quarter-wave plate is positioned adjacent the variable optical retarder to receive the light rays passing through it. The optic axis of the quarter-wave plate is aligned parallel and perpendicular to the respective horizontal and vertical polarization axes of the first light polarizing means. This orientation of the quarter-wave plate causes it to have no effect on the polarization direction of light rays exiting the variable optical retarder whenever it is commanded to provide either zero retardation or half-wave retardation.

The second color selective light polarizing means comprises a pair of linear polarizing filters positioned downstream of the quarter-wave plate. The color selective polarization axes of one of the linear polarizing filters are oriented at 45° angles relative to the optic axis of the quarter-wave plate. The color selective vertical and horizontal polarization axes of the other polarizing filter are aligned, respectively, perpendicular and parallel to the optic axis of the quarter-wave plate. The polarization axes of the second light polarizing means transmit an output color for each selected amount of optical retardation as described below.

Whenever the variable optical retarder is commanded to either the "ON" state or the "OFF" state, the polarization directions of light rays exiting the variable optical retarder are not affected by the quarter-wave plate. The light rays pass through the second light polarizing means in the "ON" state and in the "OFF" state to develop, respectively, a color mixture of 100% red and 50% green for an orangish-red output color and a color mixture of 100% blue and 50% green for a greenish-blue output color.

Whenever the variable optical retarder is commanded to the "INTERMEDIATE" state, the light rays exiting the variable optical retarder are either left- or right-circularly polarized. The quarter-wave plate receives the circularly polarized light rays and converts them back to linear polarization. The effect of this process is a rotation by 45° of the original polarization directions of the light rays exiting the first light polarizing means. The color of output light exiting the color switch is a color mixture of 100% green, 50% red, and 50% blue for a pale green output color.

Each of the three desaturated output colors developed by the switchable color filter may be characterized as pastel. The three output colors define the boundaries of an area of color space, which area is smaller than the area of color space defined by the primary colors that developed them. The switchable color filter provides, therefore, a "quasi full color" display.

Additional objects and advantages of the present invention will be apparent from the following detailed description of a preferred embodiment thereof, which proceeds with reference to the accompanying drawings.

BRIEF DESCRIPTION OF THE DRAWINGS

FIG. 3 is a diagrammatic cross-sectional side elevation view of the liquid crystal cell that is used as a variable optical retarder in a preferred embodiment of the present invention.

FIGS. 4A-4C are schematic diagrams of the director alignment configuration of the liquid crystal cell of the variable optical retarder incorporated in a preferred embodiment of the switchable color filter of the present invention in, respectively, the "ON" state, the "OFF" state, and the "INTERMEDIATE" state.

DETAILED DESCRIPTION OF PREFERRED EMBODIMENT

Figure 1:
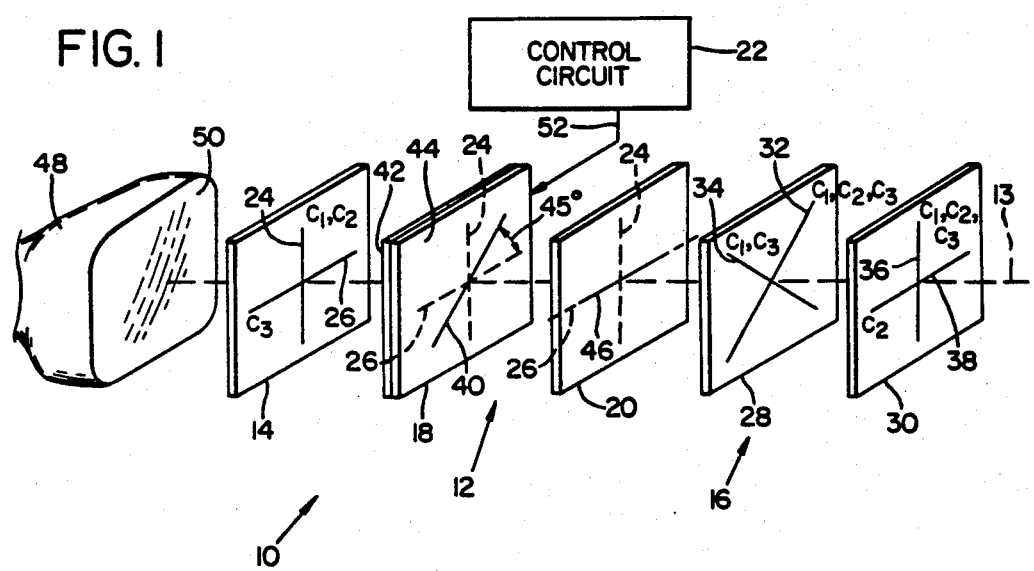
FIG. 1 is a diagram of a preferred embodiment of a switchable color filter designed in accordance with the present invention.

The switchable color filter 10 includes a variable optical retarding means 12 that is positioned along an optical path 13 in series arrangement between a first or input color selective light polarizing means 14 and a second or output color selective light polarizing means 16. Variable optical retarding means 12 comprises a variable optical retarder 18 and a quarter-wave plate 20. Variable optical retarder 18 is a nematic liquid crystal cell that provides in response to a change in magnitude of an AC voltage that is applied to the cell by a switching means or control circuit 22 different amounts of optical retardation to change the sense of the polarization states of light rays passing through it.

The input light polarizing means 14 comprises a linear polarizing filter which has a color selective vertical polarization axis 24 that passes light rays of a first primary color $C_1$ and a second primary color $C_2$, such as red and green, respectively, and a color selective horizontal polarization axis 26 that passes light rays of a third primary color $C_3$, such as blue.

The output light polarizing means comprises a pair of linear polarizing filters 28 and 30. Polarizing filter 28 has orthogonally aligned polarization axes 32 and 34. Polarization axis 32 passes white light, i.e., light rays of the colors $C_1$, $C_2$, and $C_3$; and polarization axis 34 passes light rays of the colors $C_1$ and $C_3$. Polarizing filter 30 has color selective vertical and horizontal polarization axes 36 and 38 that pass, respectively, white light and light rays of the color $C_2$.

Projection 40 of the optic axis of variable optical retarder 18 on each of its two light-communicating surfaces 42 and 44 is disposed substantially at a 45° angle relative to each one of the polarization axes of polarizing filters 14 and 30. Optic axis 40 of variable optical retarder 18 is aligned parallel to polarization axis 32 and perpendicular to polarization axis 34 of polarizing filter 28. The optic axis 46 of quarter-wave plate 20 is aligned perpendicular to vertical polarization axis 24 and parallel to horizontal polarization axis 26 of polarizing filter 14. The polarization axes of polarizing filter 14 are shown in phantom on variable optical retarder 18 and quarter-wave plate 20 to illustrate the inclination angles of their respective optic axes 40 and 46.

Switchable color filter 10 is positioned in front of a light source 48, which emits light of many wavelengths including those of the colors red, green, and blue. Light source 48 can be, for example, a cathode ray tube that provides a black and white display image on its phosphor screen 50.

Variable optical retarder 14 is switched among three optical retardation states, the "ON" state which provides essentially zero optical retardation, the "OFF" state which provides approximately half-wave optical retardation, and the "INTERMEDIATE" state which provides approximately quarter-wave optical retardation for normally incident light rays of all colors passing through it. The three optical retardation states provide switchable color filter 10 with three optical transmission states for developing light of the three output colors.

Whenever it is commanded to the "ON" optical retardation state by a voltage signal applied to output conductor 52 of control circuit 22, variable optical retarder 18 provides essentially zero retardation for light rays of all colors and thereby does not change the directions of polarization of the light rays as they pass through it. Since its optic axis 46 is aligned perpendicular and parallel to the respective polarization axes 24 and 26 of polarizing filter 14, quarter-wave plate 20 also does not change the direction of polarization of the light rays passing through it. Normally incident light rays of the colors red and green passing through vertical polarization axis 24 of polarizing filter 14 strike polarizing filter 28 with their direction of polarization forming 45° angles relative to its polarization axes 32 and 34. Components of red light of equal intensities are projected onto and transmitted by polarization axes 32 and 34 of polarizing filter 28. Light rays characterized by a resultant electric field vector of vertically polarized red light with 100% relative intensity emerge from polarizing filter 28 and pass through vertical polarization axis 36 of polarizing filter 30. Red light of 100% relative intensity, therefore, exits switchable color filter 10 in its first optical transmission state.

Components of green light of equal intensities are projected onto polarization axes 32 and 34 of polarizing filter 28, with 50% of the green light being transmitted by polarization axis 32 and 50% of the green light being absorbed by polarization axis 34. The light rays of the color green passing through polarizing filter 28 strike polarizing filter 30 with their direction of polarization forming 45° angles relative to its polarization axes 36 and 38. Components of green light of equal intensities are projected onto and transmitted by polarization axes 36 and 38 of polarizing filter 30. Green light of 50% relative intensity, therefore, also exits switchable color filter 10 in its first optical transmission state.

Normally incident light rays of the color blue passing through horizontal polarization axis 26 of polarizing filter 14 strike polarizing filter 28 with their direction of polarization forming 45° angles relative to its polarization axes 32 and 34. Components of blue light of equal intensities are projected onto and transmitted by polarization axes 32 and 34 of polarizing filter 28. Light rays characterized by a resultant electric field vector of horizontally polarized blue light with 100% relative intensity emerge from polarizing filter 28 and are absorbed by horizontal polarization axis 38 of polarizing filter 30. No blue light exits switchable color filter 10 in its first optical transmission state.

A color mixture of 100% red and 50% green, which forms an orangish-red output color, exits switchable color filter 10 in its first optical transmission state.

Whenever it is commanded to the "OFF" optical retardation state by a voltage signal applied to output conductor 52 of control circuit 22, variable optical retarder 18 provides approximately half-wave retardation for light rays of all colors and thereby changes by 90° the directions of polarization of the light rays as they pass through it. Since its optic axis 46 is aligned perpendicular and parallel to the respective polarization axes 24 and 26 of polarizing filter 14, quarter-wave plate 20 does not change further the direction of polarization of the light rays passing through it. Normally incident light rays of the colors red and green passing through vertical polarization axis 24 of polarizing filter 14 strike polarizing filter 28 with their direction of polarization forming 45° angles relative to its polarization axes 32 and 34. Components of red light of equal intensities are projected onto and transmitted by polarization axes 32 and 34 of polarizing filter 28. Light rays characterized by a resultant electric field vector of horizontally polarized red light with 100% relative intensity emerge from polarizing filter 28 and are absorbed by horizontal polarization axis 38 of polarizing filter 30. No red light exits switchable color filter 10 in its second optical transmission state.

Components of green light of equal intensities are projected onto polarization axes 32 and 34 of polarizing filter 28, with 50% of the green light being transmitted by polarization axis 32 and 50% of the green light being absorbed by polarization axis 34. The light rays of the color green passing through polarizing filter 28 strike polarizing filter 30 with their directions of polarization forming 45° angles relative to its polarization axes 36 and 38. Components of green light of equal intensities are projected onto and transmitted by polarization axes 36 and 38 of polarizing filter 30. Green light of 50% relative intensity, therefore, exits switchable color filter 10 in its second optical transmission state.

Normally incident light rays of the color blue passing through horizontal polarization axis 26 of polarizing filter 14 strike polarization filter 28 with their direction of polarization forming 45° angles relative to its polarization axes 32 and 34. Components of blue light of equal intensity are projected onto and transmitted by polarization axes 32 and 34 of polarizing filter 28. Light rays characterized by a resultant electric field vector of vertically polarized blue light with 100% relative intensity emerge from polarizing filter 28 and are transmitted by vertical polarization axis 36 of polarizing filter 30. Blue light of 100% relative intensity, therefore, exits switchable color filter 10 in its second optical transmission state.

A color mixture of 50% green and 100% blue, which forms a greenish-blue output color, exits switchable color filter 10 in its second optical transmission state.

Whenever it is commanded to the "INTERMEDIATE" optical retardation state by a voltage signal applied to conductor 52 of control circuit 22, variable optical retarder 18 provides approximately quarter-wave retardation for light rays of all colors and thereby causes the circular polarization of the incident linearly polarized light rays. The light rays previously transmitted by vertical and horizontal polarization axes 24 and 26 of polarizing filter 14 are, respectively, right- and left-circularly polarized. Quarter-wave plate 20 removes the circular polarization from the light rays exiting variable optical retarder 18, thereby converting them back to linear polarization but angularly displacing their polarization directions clockwise by 45° from the polarization directions established by polarizing filter 14.

Normally incident light rays of the colors red and green passing through vertical polarization axis 24 of polarizing filter 14 are aligned with and pass through polarization axis 32 of polarizing filter 28. The red and green light rays exit polarizing filter 28 and strike polarizing filter 30 with their direction of polarization forming 45° angles relative to its polarization axes 36 and 38. Components of red light of equal intensities are projected onto polarization axes 36 and 38 of polarization filter 30, with 50% of the red light being transmitted by polarization axis 36 and 50% of the red light being absorbed by polarization axis 38. Red light of 50% relative intensity, therefore, exits switchable color filter 10 in its third optical transmission state.

Components of green light of equal intensities are projected onto and transmitted by polarization axes 36 and 38 of polarizing filter 30. Green light of 100% relative intensity, therefore, exits switchable color filter 10 in its third optical transmission state.

Quarter-wave plate 20 and polarizing filter 28 operate as a circular analyzer for green light because the green light rays exiting quarter-wave plate 20 are aligned with and can be transmitted only by polarization axis 32 of polarizing filter 28. (The red and blue light rays can be transmitted by both polarization axes 32 and 34.)

Normally incident light rays of the color blue passing through horizontal polarization axis 26 of polarizing filter 14 are aligned with and pass through polarization axis 34 of polarizing filter 28. The blue light rays exit polarizing filter 28 and strike polarizing filter 30 with their direction of polarization forming 45° angles relative to its polarization axes 36 and 38. Components of blue light of equal intensities are projected onto polarization axes 36 and 38 of polarizing filter 30, with 50% of the blue light being transmitted by polarization axis 36 and 50% of the blue light being absorbed by polarization axis 38. Blue light of 50% relative intensity, therefore, exits switchable color filter 10 in its third optical transmission state.

A color mixture of 50% red, 100% green, and 50% blue, which forms a pale green output color, exits switchable color filter 10 in its third optical transmission state.

Figure 2:
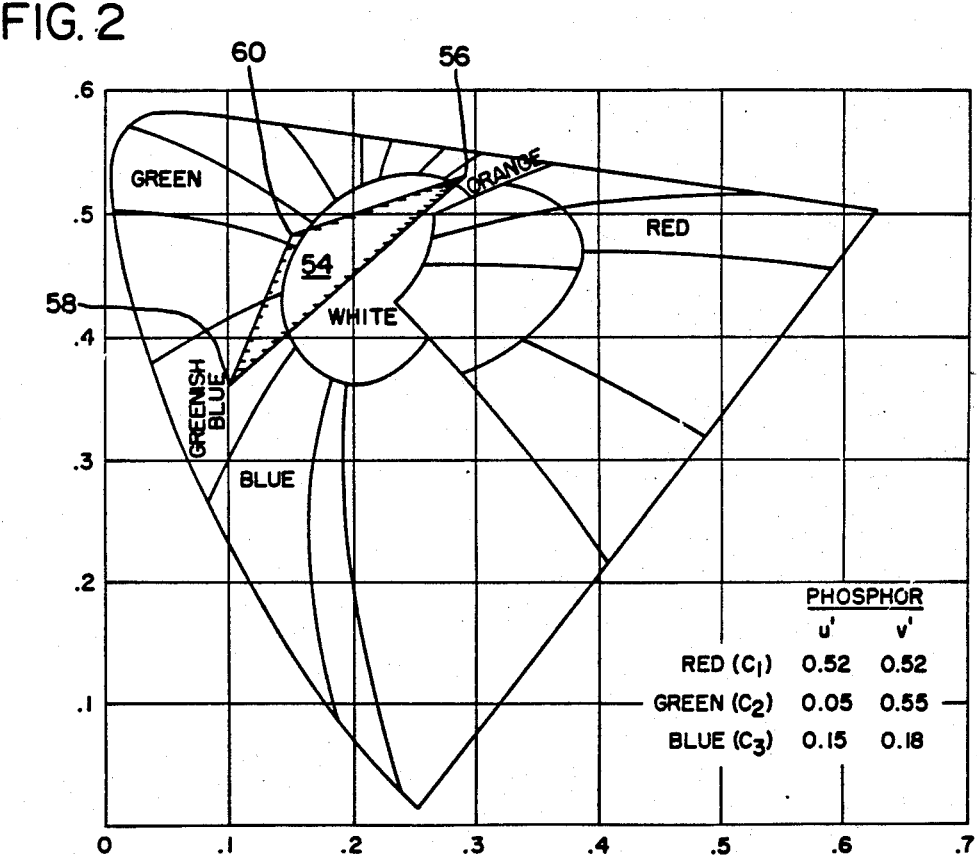
FIG. 2 is a chromaticity diagram showing the area in color space defined by the three output colors developed by the switchable color filter of FIG. 1.

FIG. 2 is a chromaticity diagram showing, for the predetermined set of primary color phosphors indicated, the area 54 that can be encompassed with intensity modulation of light rays of the three output colors of switchable color filter 10. Locations 56, 58, and 60 indicate the points that represent the respective output colors orangish-red, greenish-blue, and pale green. It will be appreciated that the area defined by locations 54, 56, and 58 is less than that which would be achievable with light outputs of the spectral primary colors, red, green, and blue. Switchable color filter 10 is, therefore, capable of developing only a quasi full color display.

Liquid Crystal Variable Optical Retarder

A preferred embodiment of the present invention incorporates a liquid crystal cell operating as a variable optical retarder that controls the retardation of light passing therethrough in response to the intensity of an electric field produced by an excitation voltage applied to the cell electrode structures.

With reference to FIG. 3, liquid crystal cell 100 includes a pair of generally parallel, spaced-apart electrode structures 102 and 104 with nematic liquid crystal material 106 included therebetween. Electrode structure 102 comprises glass dielectric substrate 108 that has on its inner surface a layer 110 of electrically conducting, but optically transparent, material such as indium tin oxide. Director alignment film layer 112 is applied to conductive layer 110 and forms a boundary between electrode structure 102 and liquid crystal material 106. The surface of film 112 which contacts the liquid crystal material is conditioned in accordance with one of two preferred methods to promote a preferred orientation of the directors of the liquid crystal material in contact therewith. The materials constituting and the corresponding methods of conditioning the director alignment film 112 are described in detail hereinbelow. Electrode structure 104 is of a construction similar to that of electrode structure 102, and the components corresponding to those of electrode structure 102 are shown with identical reference numerals followed by primes.

The short length edges of electrode structures 102 and 104 are offset relative to each other to provide access to conductive layers 110 and 110' for connecting at terminals 113 the output conductors of control circuit 22. Spacers 114 may be comprised of any suitable material such as glass fiber to preserve the general parallel relation between electrode structures 102 and 104.

With reference to FIGS. 4A-4C, the nematic director alignment configuration of layers 112 and 112' in liquid crystal cell 100 is described in Column 7, lines 48-55 of U.S. Pat. No. 4,333,708 of Boyd, et al. It will be understood, however, that the liquid crystal cell described in the Boyd, et al. patent differs from that used in the present invention in that the former includes an alternating-tilt geometry type configuration of which the director alignment of cell 100 comprises only a portion. The cell of the Boyd, et al. patent is constructed to promote disclination movement within the cell in an attempt to provide a bistable switching device.

The film layer 112 of electrode structure 102 is conditioned so that the electrode structure surface contacting directors 116 are aligned parallel to each other at a tilt bias angle $+\theta$, which is measured in the counterclockwise sense with reference to the surface of film layer 112. The film layer 112' of electrode structure 104 is conditioned so that the electrode structure surface contacting directors 118 are aligned parallel to each other at a tilt bias angle $-\theta$, which is measured in the clockwise sense with reference to the surface of film layer 112'. Thus, liquid crystal cell 100 is fabricated so that the surface contacting directors 116 and 118 of the opposed surfaces of director alignment layers 112 and 112' of electrode structures 102 and 104, respectively, are tilt-biased in opposite directions.

A first preferred method of effecting the desired alignment of the surface contacting directors entails the use of polyimide as the material that comprises the alignment film layers 112 and 112' on electrode structures 102 and 104, respectively. Each alignment film layer is rubbed to produce a tilt bias angle $|\theta|$, with 2° to 5° being the preferred range. A second preferred method of effecting the desired alignment of the surface contacting directors entails the use of silicon monoxide as the material which comprises the alignment film layers 112 and 112' of electrode structures 102 and 104, respectively. The silicon monoxide layer is evaporated and vapor deposited preferably at a 5° angle measured from the electrode structure surface in an amount sufficient to produce a tilt bias angle $|\theta|$ of between 10° to 30°, with 15° to 25° being the preferred range.

It will be appreciated that methods for depositing silicon monoxide or other alignment materials to align liquid crystal molecules in a predetermined direction have been disclosed previously by others and are known to those having ordinary skill in the art. One such method, for example, is disclosed in U.S. Pat. No. 4,165,923 of Janning.

FIG. 4A depicts the orientation of surface noncontacting directors 120 when an AC signal $V_1$ of approximately 2 kHz and 20 Vrms is applied to conductive layers 110 and 110' of electrode structures 102 and 104, respectively. The signal $V_1$ on conductive layer 110' with conductive layer 110 grounded constitutes a first switching state produced at the output of control circuit 22 and produces an alternating electric field, E, between electrode structures 102 and 104 within the liquid crystal cell 100 to force the cell into its "ON" optical retardation state. A substantial number of the surface noncontacting directors 120 of a liquid crystal material 106 that has a positive anisotropy value align essentially end-to-end along direction 121 of the electric field flux lines within the cell, which direction is normal to the conditioned surfaces of the electrode structures. Thus, when cell 100 is excited into its "ON" state, the surface noncontacting directors 120 are aligned perpendicularly to the surfaces of the cell.

FIG. 4B depicts the orientation of surface noncontacting directors 120 after the signal $V_1$ is removed so that the alignment of surface noncontacting directors is influenced not by an electric field produced between electrode structures 102 and 104 within the cell, but by the intermolecular elastic forces which cause relaxation of the surface noncontacting directors from the end-to-end alignment of the "ON" state. The removal of signal $V_1$ constitutes a second switching state produced at the output of control circuit 22. The director orientation shown in FIG. 4B corresponds to that of "OFF" optical retardation state of the cell.

Switching cell 100 to the "OFF" state can also be accomplished by applying to layer 110' of the cell an AC signal $V_2$ produced at the output of control circuit 22 having a voltage level which is less than that of signal $V_1$ and generally near 0 V. The frequency of signal $V_2$ is generally the same as that of signal $V_1$.

FIG. 4C depicts the orientation of surface noncontacting directors 120 when an AC signal $V_3$ of approximately 2 kHz and approximately 10 Vrms is applied to conductive layer 110' of the cell. The signal $V_3$ constitutes a third switching state produced at the output of control circuit 22 that causes relaxation of the surface noncontacting directors of an intermediate extent between the end-to-end alignment of the "ON" state and the relaxed alignment of the "OFF" state.

During the transition from the "ON" state through the "INTERMEDIATE" state to the "OFF" state of the liquid crystal cell, the surface noncontacting directors recede from the end-to-end alignment normal to the electrode structure surfaces and attempt to assume a generally parallel relation with the adjacent directors. Thus, surface noncontacting directors 120a and 120b rotate in a clockwise sense as shown by direction arrows 122a in order to achieve a near-parallel relation as respects directors 116 and 120a, respectively; and surface noncontacting directors 120c and 120d rotate in a counterclockwise sense as shown by direction arrows 122b to achieve a near-parallel relation as respects directors 118 and 120c, respectively. Thus, when cell 100 relaxes to its "OFF" state, each one of a substantial number of the surface noncontacting directors is aligned so that it projects a director component onto the surfaces of the cell. The surface noncontacting directors, however, lie approximately in a plane which is perpendicular to the surfaces of the cell.

The method of operating the liquid crystal cell 100 as a variable optical retarder is directed to the disclination-free surface noncontacting director relaxation from the electric field aligned or "ON" state depicted by FIG. 4A to the planar configuration or "OFF" state depicted by FIG. 4B. In the present invention, liquid crystal cell 100 is operated as a zero, quarter-wave, and half-wave retarder whose optic axis corresponds to the alignment direction of the nonsurface contacting directors 120.

Linearly polarized light which propagates in direction 126 normal to the surfaces of electrode structures 102 and 104 is coincident with the direction of surface noncontacting directors 120 when the liquid crystal cell is in the "ON" state. Directors 120 are oriented in such "ON" state so that there is a negligible projection of the optic axis on the electrode structure surfaces of the cell. Under these conditions, liquid crystal cell 100 produces substantially reduced optical retardation for incident light propagating in the direction 126.

Linearly polarized light which propagates in direction 126 normal to the surfaces of electrode structures 102 and 104 is noncoincident with the alignment direction of surface noncontacting directors when the liquid crystal cell is in the "OFF" state. Directors 120 are oriented in such "OFF" state so that each one of a substantial number of them projects a component on the electrode structure surfaces of the cell. Under these conditions, liquid crystal cell 100 has an effective birefringence for generally normally incident light. The orientation of surface noncontacting directors 120 provides essentially half-wave optical retardation for light of the wavelength which satisfies the mathematical expression:

$$\Delta nd/\lambda = \tfrac{1}{2}$$

where d represents the thickness 128 and $\Delta n$ represents the effective birefringence of the cell.

It will be obvious to those having skill in the art that many changes may be made in the above-described details of the preferred embodiment of the present invention. The scope of the present invention, therefore, should be determined only by the following claims.

I claim:

1. In a switchable color filter that receives light rays of different wavelengths emitted from a light source, the improvement comprising:
    first color selective light polarizing means for transmitting polarized light rays of three primary colors, the three primary colors defining boundaries of a first area in color space;
    a single variable optical retarding means for receiving and varying the optical retardation of said polarized light rays;
    switching means in communication with the variable optical retarding means, the switching means being operable to selectively vary the amount of the optical retardation; and
    receiving the light varied by said variable optical retarder means and
    second color selective light polarizing means for transmitting light rays of three output colors, each output color corresponding to a different amount of retardation provided by the variable optical retarding means, and the three output colors including components of different pairs of the three primary colors so that the three output colors define boundaries of a second area of color space which second area is smaller than the first area.

2. The color filter of claim 1 in which the variable optical retarding means comprises a variable optical retarder and a quarter-wave plate.

3. The color filter of claim 2 in which the optic axis of the variable optical retarder and the optic axis of the quarter-wave plate are disposed at substantially a 45° angle.

4. The color filter of claim 2 in which the variable optical retarder provides in response to the switching means zero, quarter-wave, and half-wave retardation to develop the light rays of the three output colors.

5. The color filter of claim 1 in which the second light polarizing means comprises two linear polarizing filters, one of the two polarizing filters operating in cooperation with the quarter-wave plate to form a circular analyzer of one of the primary colors.

6. The color filter of claim 5 in which the variable optical retarder provides quarter-wave retardation to enable the one polarizing filter and quarter-wave plate to operate as the circular analyzer.

7. The color filter of claim 1 in which the first light polarizing means comprises a linear polarizing filter and the second light polarizing means comprises two linear polarizing filters, each one of the three polarizing filters having orthogonally aligned polarization axes, the polarization axes of one of the polarizing filters being plane parallel and oriented at substantially 45° angles relative to the polarization axes of the other two polarizing filters.

8. The color filter of claim 7 in which the polarization axes of one of the two linear polarizing filters of the second light polarizing means are disposed at substantially 45° angles relative the polarization axes of the the other linear polarizing filters.

9. The color filter of claim 1 in which the first light polarizing means comprises a linear polarizing filter with orthogonally aligned polarization axes, and the optic axis of the quarter-wave plate is aligned substantially parallel to one of the polarization axes.

10. The color filter of claim 1 in which the variable optical retarding means includes a liquid crystal cell comprising liquid crystal material which has directors and is contained between a pair of opposed electrode structures, each electrode structure having an inner surface that includes a director alignment layer which has been conditioned so that the directors of the liquid crystal material in contact therewith become substantially uniformly aligned to form tilt bias angles with the conditioned surfaces, the tilt bias angles of the directors in contact with one conditioned surface being defined in a rotational sense opposite to the tilt bias angles of the directions in contact with the other conditioned surface.

11. In a switchable color filter that receives light rays of different wavelengths emitted from a light source, the improvement comprising:

three color selective linear polarizing filters, one of the polarizing filters defining a light output of the color filter and each one of the polarizing filters transmitting polarized light rays of three primary colors, the three primary colors defining boundaries of a first area in color space;

a single variable optical retarding means for retarding polarized light, the variable optical retarding means being operable to provide to light rays passing therethrough three amounts of optical retardation, of which one amount causes a circular polarization of linearly polarized incident light rays of a preassigned color said variable optical retarding means being positioned between two of the polarizing filters; and switching means in communication with the variable optical retarding means to select one of the amounts of optical retardation to transmit from the output light rays of one of three colors, the three colors defining boundaries of a second area in color space which second area is smaller than the first area.

12. The color filter of claim 11 in which the variable optical retarding means comprises a quater-wave plate and a variable optical retarder that selectably develops zero, quarter-wave, and half-wave optical retardation.

13. The color filter of claim 12 in which circularly polarized light rays pass through the variable optical retarder whenever it provides approximately quarter-wave optical retardation.

14. The color filter of claim 12 in which the preassigned color of light corresponds to the wavelength to which the quarter-wave plate is tuned.

15. The color filter of claim 12 in which the optic axis of the quarter-wave plate and the polarization axes of one of the polarizing filters are disposed at substantially 45° angles.

16. The color filter of claim 15 in which the quarter-wave plate and the one of the polarizing filters comprise a circular analyzer for light rays of the preassigned color that corresponds to the wavelength of ight to which the quarter-wave plate is tuned.

17. The color filter of claim 11 in which the variable optical retarding means includes a liquid crystal cell comprising liquid crystal material which has directors and is contained between a pair of opposed electrode structures, each electrode structure having an inner surface that includes a director alignment laver which has been conditioned so that the directors of the liquid crystal material in contact therewith become substantially uniformly aligned to form tilt bias angles with the conditioned surfaces, the tilt bias angles of the directors in contact with one conditioned surface being defined in a rotational sense opposite to the tilt bias angles of the directors in contact with the other conditioned surface.

* * * * *

UNITED STATES PATENT AND TRADEMARK OFFICE
CERTIFICATE OF CORRECTION

PATENT NO. : 4,674,841

DATED : June 23, 1987

INVENTOR(S) : Thomas S. Buzak

It is certified that error appears in the above-identified patent and that said Letters Patent is hereby corrected as shown below:

On the title page, item [54], and column 1, lines, correct the title to read
--COLOR FILTER SWITCHABLE AMONG THREE STATES VIA A VARIBLE RETARDER--

Column 10, line 28, rewrite claim to read

--1. In a switchable color filter that receives light rays of different wavelengths emitted from a light source, the improvement comprising:

first color selective light polarizing means for transmitting polarized light rays of three primary colors, the three primary colors defining boundaries of a first area in color space;

a single variable optical retarding means for receiving and varying the optical retardation of said polarized light rays;

switching means in communication with the variable optical retarding means, the switching means being operable to selectively vary the amount of the optical retardation; and second color selective light polarizing means for receiving the light varied by said variable optical retarder means and transmitting light rays of three output colors, each output color corresponding to a different amount of retardation provided by the variable optical retarding means, and the three output colors including components of different pairs of the three primary colors so that the three output colors define boundaries of a second area of color space which second area is smaller than the first area.--

UNITED STATES PATENT AND TRADEMARK OFFICE
CERTIFICATE OF CORRECTION

PATENT NO. : 4,674,841

DATED : June 23, 1987

INVENTOR(S) : Thomas S. Buzak

It is certified that error appears in the above-identified patent and that said Letters Patent is hereby corrected as shown below:

Column 10, line 64, change "1" to --2--.
Column 11, line 19, change "1" to --2--.

Signed and Sealed this

Ninth Day of January, 1990

*Attest:*

JEFFREY M. SAMUELS

*Attesting Officer*     *Acting Commissioner of Patents and Trademarks*